J. B. CONKLIN.
Stubble Cutter.
No. 80,394.
Patented July 28, 1868.
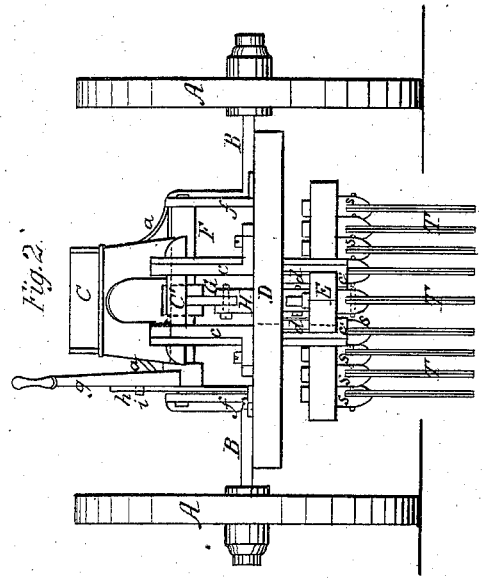
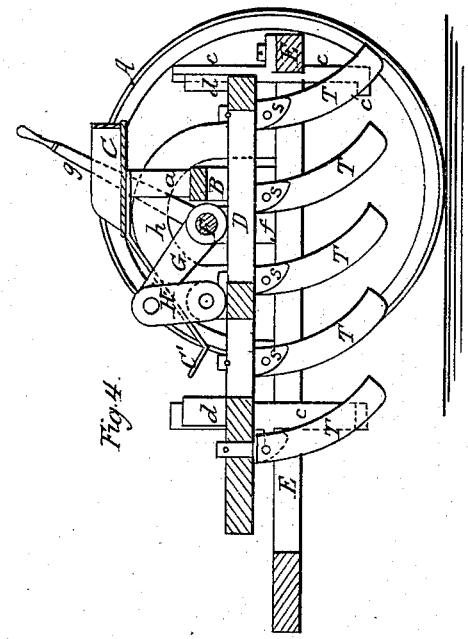
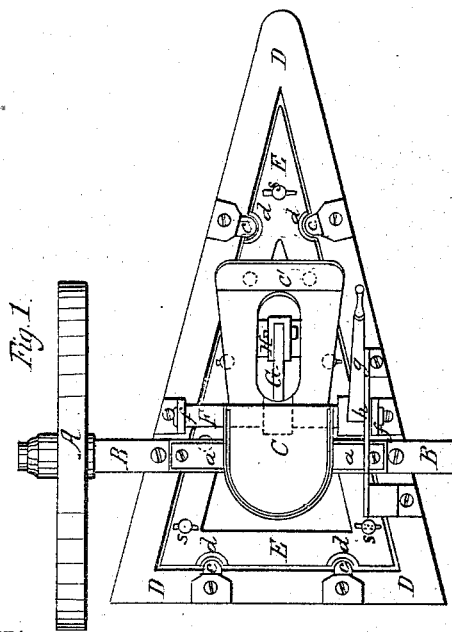
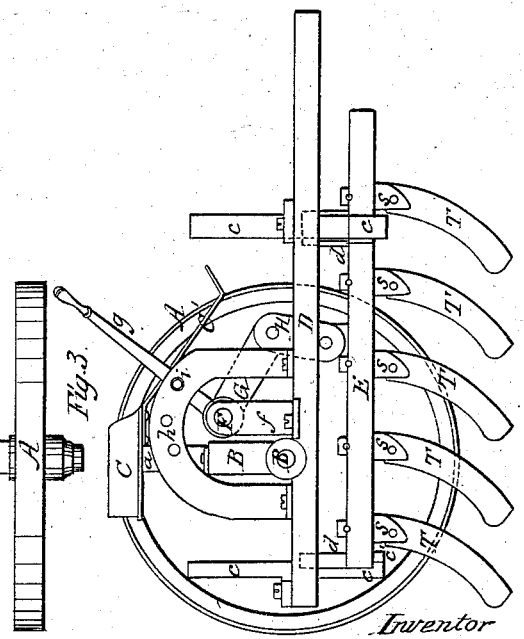
Witnesses,
R. J. Campbell
J. Campl.
Inventor
J. B. Conklin
by
Mason, Fenwick & Lawrence

United States Patent Office.

ISAIAH B. CONKLIN, OF BALTIMORE, MARYLAND.

Letters Patent No. 80,394, dated July 28, 1868.

IMPROVEMENT IN STUBBLE-CUTTER.

*The Schedule referred to in these Letters Patent and making part of the same.*

TO ALL WHOM IT MAY CONCERN:

Be it known that I, ISAIAH B. CONKLIN, of Baltimore city, in the county of Baltimore, and State of Maryland, have invented a new and improved Stubble-Cutter; and I do hereby declare that the following is a full, clear, and exact description thereof, reference being had to the accompanying drawings, making a part of this specification, in which—

Figure 1 is plan view of the improved machine for cutting stubble.

Figure 2 is an elevation of one side of the machine, with one wheel removed, showing the cutters depressed.

Figure 3 is a front elevation of the machine, with the cutters depressed.

Figure 4 is a longitudinal section, taken in a vertical plane through the centre of the machine, showing the cutters elevated.

Similar letters of reference indicate corresponding parts in the several figures.

This invention relates to certain novel improvements on machinery which is chiefly designed for cutting up corn-stubble, so as to avoid the labor and expense hitherto attending the eradication of corn-stubble from land upon which it is desired to grow grass and other crops requiring the use of the scythe or harvesting-machinery to cut.

The nature of my invention consists in a gang of cutting-swords, arranged in close proximity to each other, and applied to a vertically-adjustable frame, which is supported upon transporting-wheels, said swords or cutters being adapted for entering the soil a proper depth, and cutting up corn-stubble, or the roots of corn which are left in the ground after harvesting the stalks, as will be hereinafter explained.

To enable others skilled in the art to understand my invention, I will describe its construction and operation.

In the accompanying drawings, A A represent two transporting-wheels, which are applied to an axle, B, the central portion of which is bent upward, so as to form an arch, for a purpose which will be hereinafter explained. To this axle B an open triangular frame, D, is rigidly secured, which is adapted for receiving within it a triangular cutter-carrying frame, E, as shown in fig. 1. The front end or angle of the main frame D should be provided with a draught-pole, or other means whereby animals can be conveniently hitched to it, for drawing the machine along.

The frame E is provided, on its lower side, with two rows of cutting-blades or swords, T, which rows diverge from the front central sword backward, and thus present a great number of cutting-edges, arranged in lines, which are very close together, as shown in fig. 3. Each one of the swords or cutting-blades is curved backward, so as to make a drawing cut in its action upon stubble, and each cutter is secured rigidly, at its upper end, between jaws of a holding-portion, s, by means of a transverse pin or bolt, as shown in figs. 2 and 4. If desirable, both ends of each cutter may be perforated, and adapted for being secured to its holder, s, so that, when the cutting-edge, near the lower end of a cutter, wears dull, the cutter can be reversed, and a sharp cutting-edge brought into operation.

Each one of the holders s is constructed with a stud upon it, which is passed up through the frame E, and held rigidly in place by means of a key inserted through it, in the manner shown in the drawings, or in any other suitable way.

The frame E is provided with semi-cylindrical portions, d, arranged in front and in rear of the axle B, as shown in fig. 1, and extending perpendicularly above the upper surface of said frame, which portions are adapted to receive guides c, that are securely fastened to the frame D, and made so as to extend above and below this frame, terminating at their lower ends in foot-pieces C', which afford bearings for frame E when it is fully depressed, to bring the cutters into action.

The pieces c and d are designed to serve as means whereby the frame E will be held parallel to the plane of frame D, when the former is raised or depressed. If desirable, the guides C may be constructed and applied to the frame D, that they can be adjusted vertically, and fixed at any desired height, for the purpose of sustaining the frame E, upon the feet c', at any desired distance from the ground, according to the depth at which it is desired to run the cutters in the ground.

At an intermediate point between the front and rear ends of the frame E, and secured to a cross-beam of this frame, is an eye-piece, to which a short link, H, is pivoted; and to this link an arm, G, which projects from a horizontal transverse rock-shaft, F, is pivoted. The rock-shaft F is supported in bearings $f f$, upon the main frame D, and is provided with a hand-lever, $g$, having a catch-pin, $i$, on one side, which will engage with any one of several holes made through a segment, $h$. This segment $h$ is secured to the main frame D, and is designed for receiving the catch-pin $i$, on lever $g$, and holding this lever and the frame E at any required height; also, for sustaining said frame in the elevated position shown in fig. 4, with the cutters out of operation, when it is desired to move the machine from one place to another, and to turn the machine at the ends of rows of stubble.

By arching the axle B, the frame E is allowed to be elevated above the axes of the transporting-wheels, or above the frame D, to such a height that the cutters will not be liable to strike a stump or other object when raised out of operation. The arched axle also serves as an elevated support for the driver's seat C, which is mounted upon stands $a\ a$, which are secured to the axle, as shown in the drawings.

When a gang of cutters, constructed and arranged as I have above described, are drawn over a field abounding in corn-stubble, and allowed to dip into the ground about six inches, they will cut up and so reduce the stubble that it may be readily turned into rot by a subsequent use of the plow, thereby leaving the field free from obstructions which would be liable to injure the machinery used for cutting grass or other crops grown upon such field.

Having described my invention, what I claim as new, and desire to secure by Letters Patent, is—

1. Curved or inclined cutting-swords T, arranged and applied to the frame of a carriage, and adapted for cutting corn-stubble, substantially as described.

2. Cutting-swords T, applied to a vertically-adjustable triangular frame, E, which is supported by draught-frame D, substantially as described.

ISAIAH B. CONKLIN.

Witnesses:
J. EMORY WEATHERBY,
JEREMIAH WEATHERBY.